United States Patent
Chapman et al.

(10) Patent No.: US 10,125,779 B2
(45) Date of Patent: Nov. 13, 2018

(54) SYSTEM AND METHOD FOR TURBOMACHINERY VANE DIAGNOSTICS

(71) Applicant: General Electric Company, Schenectady, NY (US)

(72) Inventors: Seth Harmon Chapman, Anderson, SC (US); John Carver Maters, Taylors, SC (US); David Terry Trayhan, Greenville, SC (US)

(73) Assignee: General Electric Company, Schenectady, NY (US)

(*) Notice: Subject to any disclaimer, the term of this patent is extended or adjusted under 35 U.S.C. 154(b) by 42 days.

(21) Appl. No.: 15/371,020

(22) Filed: Dec. 6, 2016

(65) Prior Publication Data

US 2018/0156226 A1 Jun. 7, 2018

(51) Int. Cl.
| | |
|---|---|
| *F04D 27/00* | (2006.01) |
| *F04D 29/56* | (2006.01) |
| *F04D 29/54* | (2006.01) |
| *G05B 19/402* | (2006.01) |
| *G05B 23/02* | (2006.01) |
| *F01D 9/04* | (2006.01) |

(52) U.S. Cl.
CPC ........... *F04D 27/002* (2013.01); *F01D 9/041* (2013.01); *F04D 27/001* (2013.01); *F04D 29/542* (2013.01); *F04D 29/563* (2013.01); *G05B 19/402* (2013.01); *G05B 23/0221* (2013.01); *F05D 2250/51* (2013.01); *F05D 2260/80* (2013.01); *F05D 2270/46* (2013.01); *F05D 2270/62* (2013.01); *F05D 2270/64* (2013.01); *F05D 2270/80* (2013.01); *G05B 2219/32234* (2013.01); *G05B 2219/39221* (2013.01)

(58) Field of Classification Search
None
See application file for complete search history.

(56) References Cited

U.S. PATENT DOCUMENTS

| | | |
|---|---|---|
| 5,239,874 A | 8/1993 | Hale |
| 5,893,047 A | 4/1999 | Gimblett et al. |
| 6,722,845 B2 | 4/2004 | Chard et al. |
| 7,039,554 B2 | 5/2006 | Nguyen et al. |
| 7,096,657 B2 * | 8/2006 | Mahoney ............. F01D 17/162 415/150 |
| 7,211,982 B1 | 5/2007 | Chang et al. |

(Continued)

*Primary Examiner* — Jason Lin
(74) *Attorney, Agent, or Firm* — Fletcher Yoder, P.C.

(57) ABSTRACT

Systems and methods include an actuation system of turbomachinery includes a first actuator configured to control pitch of vanes of the turbomachinery and a first positioner configured to position the first actuator to control the pitch of the vanes. The actuation system also includes a second actuator configured to control the pitch of the vanes of the turbomachinery and a second positioner configured to position the second actuator to control the pitch. The actuation system also includes a controller system communicably coupled to the first and second positioners where the controller system is configured to drive the first positioner in an operation mode based at least in part on a set point. The controller system is also configured to set the second positioner in a diagnostic mode and obtain data from the first positioner and the second positioner where the data indicates operating conditions of the turbomachinery.

16 Claims, 4 Drawing Sheets

(56) References Cited

U.S. PATENT DOCUMENTS

| | | |
|---|---|---|
| 7,283,934 B2 | 10/2007 | Deller et al. |
| 7,292,954 B2 | 11/2007 | Deller et al. |
| 7,457,785 B1 | 11/2008 | Greitzer et al. |
| 7,574,324 B2 | 8/2009 | Ueno |
| 8,240,223 B2 | 8/2012 | Jones et al. |
| 8,275,507 B2 | 9/2012 | Bader et al. |
| 9,068,470 B2 | 6/2015 | Mills et al. |
| 9,092,030 B2 | 7/2015 | Weiss et al. |
| 2005/0147492 A1* | 7/2005 | Mahoney ............... F01D 17/162 415/148 |
| 2006/0029494 A1 | 2/2006 | Bruce et al. |
| 2006/0047403 A1 | 3/2006 | Volponi et al. |
| 2007/0050115 A1* | 3/2007 | Discenzo ............... B66C 13/063 701/50 |
| 2008/0258560 A1* | 10/2008 | Dubois .................... H02J 4/00 307/31 |
| 2009/0064655 A1* | 3/2009 | Regunath ................ G05B 9/02 60/39.091 |
| 2009/0123272 A1* | 5/2009 | Love .................... F01D 17/165 415/148 |
| 2010/0300816 A1 | 12/2010 | Linke et al. |
| 2011/0119032 A1 | 5/2011 | Liu et al. |
| 2013/0338898 A1* | 12/2013 | Aurousseau ....... G05B 23/0221 701/100 |
| 2014/0169948 A1* | 6/2014 | Kay ..................... F01D 17/162 415/148 |
| 2014/0199157 A1 | 7/2014 | Haerms et al. |
| 2016/0032703 A1* | 2/2016 | Broussard ............... E21B 43/26 166/250.01 |
| 2016/0123238 A1* | 5/2016 | Kay ......................... F02C 9/20 415/1 |
| 2016/0222890 A1* | 8/2016 | Luehrsen ......... F02M 35/10386 |
| 2017/0089258 A1* | 3/2017 | Ritter .................. G07C 5/0808 |

\* cited by examiner

SYSTEM AND METHOD FOR TURBOMACHINERY VANE DIAGNOSTICS

BACKGROUND

The subject matter disclosed herein relates to turbomachinery, and more specifically, to a system and method for inlet guide vane and variable stator vane actuation system prognostics and diagnostics.

Certain turbomachinery, such as gas turbine systems, generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. The flow and pressure of the fluids into the compressor or turbine may be modified by utilizing a vane actuation system in the gas turbine system. However, components of the gas turbine system may experience wear and tear during use. It would be beneficial to provide prognostic and diagnostic information for the gas turbine system.

BRIEF DESCRIPTION

Certain embodiments commensurate in scope with the present disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, an actuation system of turbomachinery includes a first actuator configured to control pitch of vanes of the turbomachinery and a first positioner configured to position the first actuator to control the pitch of the vanes. The actuation system also includes a second actuator configured to control the pitch of the vanes of the turbomachinery and a second positioner configured to position the second actuator to control the pitch. The actuation system also includes a controller system communicably coupled to the first and second positioners where the controller system is configured to drive the first positioner in an operation mode based at least in part on a set point of the turbomachinery. The controller system is also configured to set the second positioner in a diagnostic mode rather than the operation mode and obtain data from the first positioner and the second positioner where the data indicates operating conditions of the turbomachinery. Moreover, the controller system is configured to control the turbomachinery based at least in part on the operating conditions of the turbomachinery.

In a second embodiment, tangible, non-transitory, and computer-readable medium storing instructions thereon where the instructions, when executed, are configured to cause a processor to drive a first positioner of a first actuator of vanes of turbomachinery in an operation mode based at least in part on a set point of the turbomachinery. The instructions are also configured to cause the processor to set a second positioner of a second actuator of the vanes in a diagnostic mode rather than the operation mode. The instructions are further configured to cause the processor to obtain data from the first positioner and the second positioner where the data indicates operating conditions of the turbomachinery and control the turbomachinery based at least in part on the operating conditions of the turbomachinery.

In a third embodiment, a turbine system includes a compressor that includes a plurality of inlet guide vanes (IGV) each with a variable IGV pitch and each guiding incoming fluid into the compressor and a plurality of variable stator vanes (VSV) each with a variable VSV pitch and each controlling flow of fluid through the compressor. The turbine system also includes a first IGV actuator configured to control pitch of the each of the IGVs of the plurality of IGVs and a second IGV actuator configured to control pitch of the each of the IGVs of the plurality of IGVs. The turbine system also includes a first VSV actuators configured to control pitch of each of the VSVs of the plurality of VSVs and a second VSV actuators configured to control pitch of each of the VSVs of the plurality of VSVs. The turbine system also includes multiple positioners each configured to respectively position the first IGV actuator, the second IGV actuator, the first VSV actuator, or the second VSV actuator to control the pitch of the IGVs or VSVs, respectively. The turbine system also includes a controller system communicably coupled to the IGV positioners and the one or more VSV positioners where the controller system is configured to drive a first positioner of the plurality of positioners in a drive mode based at least in part on a set point of the turbine system and place a second positioner in a diagnostic mode rather than the drive mode. The controller system also obtains data from the first positioner and the second positioner where the data indicates wear of the second positioner and its associated actuator.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
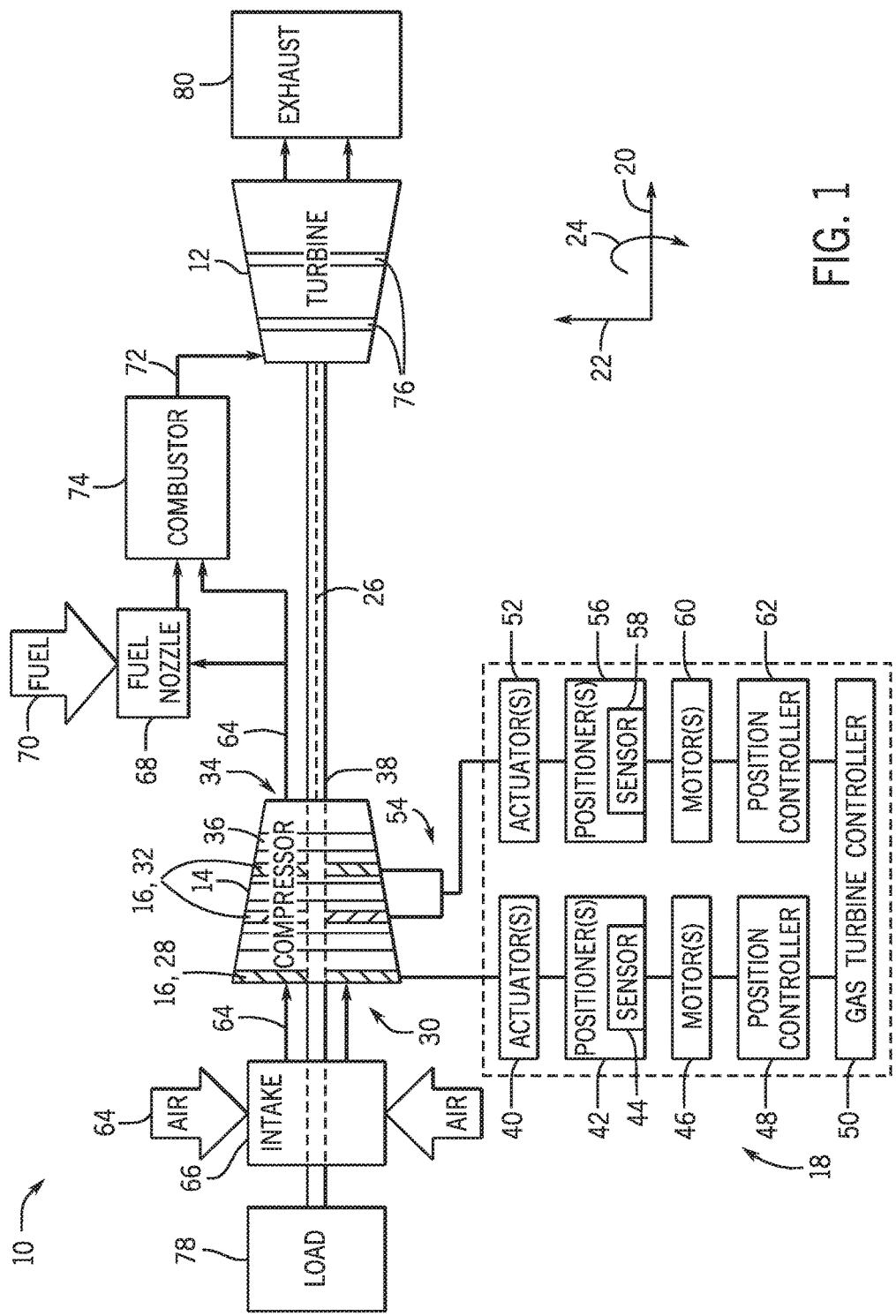
FIG. 1 is a schematic diagram of an embodiment of a gas turbine system having a compressor equipped with vanes and an actuation system to control the vanes.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As mentioned above, various components of a turbine system may undergo various conditions during use. However, detecting all occurrences within the turbine system may be costly, inefficient, and/or impossible to place sensors throughout all portions of the turbine system. Instead, indications of conditions may be derived from other measurements. For example, forces on an inlet guide vane (IGV) and/or a variable stator vane (VSV) actuation system may reflect conditions within the turbine system that may be difficult or impossible to detect directly using sensors. The IGV and VSV actuation system may change the incident angle of the IGVs and VSVs by utilizing single on a single side of an the turbine system or dual symmetrical actuators positioned on opposite sides of the turbine system. The actuators may experience dynamic and static forces and thermal changes, among other things, during operation that reflect operating conditions within the turbine system.

Accordingly, embodiments of the present disclosure relate to providing real time and historical trending data on the operation of the gas turbine IGV and VSV actuation system that may be used to predict and/or detect various conditions within the turbine system. In an embodiment, the IGV and VSV actuation system may include single or dual positioners that monitor usage characteristics of the dual actuators via sensors during operation. The positioners may utilize electric and/or hydraulic power. A turbine master controller may communicate with the dual positioners to transmit position commands and parameter settings, and to receive position feedback and/or diagnostic data over a communication bus. In some embodiments, the communication bus may be dual and the bus may or may not be redundant.

In some embodiments, the positioners may continuously monitor the dynamic and static forces of the actuators by utilizing a sensor to obtain trending real time data relating, for example, to the current or amperage used to maintain position of the actuators to a commanded position. For example, on the electrically actuated Inlet Guide Vane (IGV) and/or Variable Stator Vane (VSV) motors of a compressor, feedback data indicates the current amperage to drive the actuator motors as the respective vane arms are moved and/or held in place. Accordingly, the sensor may be a non-invasive current or amperage sensor suitable for transmitting a signal representative of the current used by the positioner(s).

With two actuators at the same compressor position axially but on opposite sides of a compressor, mirrored about the centerline of the compressor, both actuators move concurrently to position the vanes. In some embodiments, the actuators are mechanically tied together with a unison ring that goes circumferentially all the way around the compressor. The IGV's have a first set of actuators and separately the VSV's stages 1-3 share a second set of actuators. One actuator in a set may be placed in a diagnostic (e.g., non-driving, backdrive, or off mode). For example, with the turbine off (e.g., during a shutdown sequence), one actuator may be off. Since the diagnostic actuator is not driving, it retrieves more accurate information than is derived from the other actuator that is still on. This is true because the driving actuator is driven at a level that reduces sensitivity to variations. The diagnostic actuator may obtain actuator health indications about itself or the driving actuator.

Turning now to the figures, FIG. 1 illustrates a block diagram of an embodiment of a gas turbine system 10 having a turbine 12 suitable for combusting a carbonaceous fuel to produce rotative power. Also shown is a compressor 14 equipped with vanes 16 that may be adjusted by an actuation system 18. Throughout the discussion, a set of axes will be referenced. These axes are based on a cylindrical coordinate system and point in an axial direction 20, a radial direction 22, and a circumferential direction 24. For example, the axial direction 20 extends along a longitudinal axis 26 of the gas turbine system 10, the radial direction 22 is orthogonal to and extends away from the longitudinal axis 26, and the circumferential direction 24 extends around the longitudinal axis 26. Furthermore, it should be noted that a variety of rotary equipment, such as compressors 14, turbines 12, pumps, and/or the like, may benefit from the adjustable vanes 16 and the actuation system 18.

As shown, the compressor 14 includes multiple stages of the vanes 16 disposed at various positions along the compressor 14 in the axial direction 20. More specifically, the compressor 14 includes vanes 16 that are classified as inlet guide vanes (IGV) 28 positioned at an inlet 30 of the compressor 14 and variable stator vanes (VSV) 32 disposed between the inlet 30 and an outlet 34 of the compressor 14. The compressor 14 may also include rotor blades disposed between the IGVs 28 and the VSVs 32. In general, the rotor blades may be coupled to a rotor of the compressor 14, and rotate about the longitudinal axis 26 in the circumferential direction 24 during operation of the compressor 14. On the other hand, the IGVs 28 and the VSVs 32 are coupled to stator (e.g., stationary) components of the compressor 14, and generally do not rotate about the longitudinal axis 26.

As illustrated, the actuation system 18 is coupled to the IGVs 28 and the VSVs 32. However, in certain embodiments, the actuation system 18 may be coupled to only a portion of the IGVs 28 and VSVs 32. In other words, a portion of the compressor vanes 16 may have a fixed pitch or angle, whereas another portion of the compressor vanes 16 may have an adjustable pitch that is controlled by the actuation system 18. As will be described in further detail below, the actuation system 18 may include IGV actuator(s) 40 coupled to the IGVs 28, IGV positioner(s) 42 that position the IGV actuator(s) 40. The IGV positioners 42 each include one or more sensors 44 and each monitors position and force applied to each IGV actuator 40. The actuation system 18 includes IGV motor(s) 46. The IGV motors 46 may include electric motors or hydraulic propulsion systems that may drive an IGV actuator 40. In some embodiments, the IGV motors 46 may be integrated into the IGV actuator 40 such that application of a current to the IGV actuator 40 directly causes movement of a corresponding unison ring. The actuator system 18 also includes a position controller 48 that may provide signals to the IGV motor 46 and the IGV positioner 42. Moreover, a turbine master controller 50 provides control signals to and receives data from the IGV position controller 48 and monitors and controls performance of the turbine system 10. The turbine master controller 50 determines deviations from a set point and makes variations in an attempt to achieve set points. The controllers 48 and 50 may include one or more memories and one or more physical processors. The sensors 44 may include a current sensor, position sensor, thermal sensor, force sensor, vibration sensor, hydraulic transducers, and/or other suitable sensors that provide data about the IGV actuators 40 to the controller 50.

In a similar manner, VSV actuator(s) 52 controls angles of the VSVs 32. For example, the VSV actuator 52 may adjust a torque tube 54. As discussed below, the torque tube 54 transmits radial forces along the axial direction 20 to one or more unison rings that each in turn control an angle of each of the VSVs 32. VSV positioner(s) 56 position the VSV actuator(s) 52 and may include one or more sensors 58. Also, VSV motor(s) 60 may each drive a VSV actuator 52. A VSV position controller 62 may control the VSV motor(s) 60 and the VSV positioner(s) 56, and the turbine master controller 50 may govern the operation of the VSV position controller 62. Moreover, similar to the IGV motor 46, the VSV motor 60 may be integrated into the VSV actuator 52.

Likewise, the sensors 58 may include a current sensor, position sensor, thermal sensor, force sensor, vibration sensor, hydraulic transducers, and/or other suitable sensors that provide data about the IGV actuators 40 to the controller 50. Further, the IGV and VSV position controllers 48 and 62 and the turbine master controller 50 may generally be referred to as a controller system. It should be appreciated that the controller system may include any number of controllers to control operation of the turbine system 10.

During operation of the turbine system 10, the actuator system 18 may be used to adjust the angle or pitch of the IGVs 28 and the VSVs 32. For example, a lower pitch of the IGVs 28 and the VSVs 32 may be used during start-up operation, when flow rates and pressures are generally lower. In other words, a lower pitch at the IGVs 28 and the VSVs 32 may provide less resistance to flow as the IGVs 28 and the VSVs 32 are generally less aligned with the longitudinal axis 26 that during operation at full load. In addition, adjusting the IGVs 28 and VSVs 32 may counteract pressure and flow fluctuations that occur within the compressor 14. The IGVs 28 and VSVs 32 increase the operability of the compressor 14 and the gas turbine system 10. Operation of the gas turbine system 10 is summarized below.

An oxidant 64 flows from an intake 66 into the compressor 14, where the rotation of the compressor blades 36 compresses and pressurizes the oxidant 64. The oxidant 64 may include ambient air, pure oxygen, oxygen-enriched air, oxygen-reduced air, oxygen-nitrogen mixtures, or any suitable oxidant that facilitates combustion of fuel. The following discussion refers to air 64 as an example of the oxidant, but is intended only as a non-limiting example. The air 64 flows into a fuel nozzle 68. Within the fuel nozzle 68, fuel 70 mixes with the air 64 at a ratio suitable for combustion, emissions, fuel consumption, power output, and the like. Thereafter, a mixture of the fuel 70 and the air 64 is combusted into hot combustion products 72 within a combustor 74. The hot combustion products 72 enter the turbine 12 and force rotor blades 76 to rotate, thereby driving the shaft 38 into rotation. The rotating shaft 38 provides the energy for the compressor 14 to compress the air 64. More specifically, the rotating shaft 38 rotates the compressor blades 36 attached to the shaft 38 within the compressor 14, thereby pressurizing the air 64 that is fed to the combustor 74. Furthermore, the rotating shaft 38 may drive a load 78, such as an electrical generator or any other device capable of utilizing the mechanical energy of the shaft 38. After the turbine 12 extracts useful work from the combustion products 72, the combustion products 72 are discharged to an exhaust 80.

The actuation system 18 may aid in pressurizing the air 64 by positioning the IGVs 28 and VSVs 32 to desired incident angles. Furthermore, using the actuation system, the controller 50 may detect current conditions of the turbine system 10 that may be difficult or impossible to measure directly. For instance, the force used to hold at or move to a certain angle may be indicative that the turbine is undergoing a compressor surge (complete disruption of flow through compressor 14), a compressor stall (a local disruption of flow through the compressor 14), or other aeromechanical factors. The updates from the sensors 44 and 58 may be received at a rate (e.g., 1-40 ms) that may occur more frequently than vibrational patterns. However, this information may be used to analyze such information to determine frequencies of portions of changes of the signals using various transformations, such as fast Fourier transforms (FFTs). This information may be compared to information stored in memory based on matched conditions or expected conditions. The information stored in memory may correspond to changes in the force used to cause the actuators 40 and/or 52 to move or hold the vanes at a set angle. Different data sets may be stored that correspond to various compressor events such as compressor surge, compressor stall (i.e., rotating stall), inlet temperature distortions, cold days, hot days, water wash, wet compression, or other compressor events that may occur. Furthermore, if measured parameters exceed values expected for a corresponding condition, the controller 50 may warn a user or change operation. These exceeding expected values may correspond to a ground vortex, excessing inlet temperature distortion, or other conditions that have an increased capability to interfere with operation of one or more portions of the turbine system 10 even to the point of driving the one or more portions of the turbine system 10 offline.

Returning to FIG. 1, as turbine system 10 is operating, the positioners' sensors 44 and 58 may transmit usage characteristic data to the master controller 50, which may then derive changes in operation of the actuators, such as an increase in force to achieve or maintain a set point angle. Further, the master controller 50 may store data received from the sensors to utilize for analysis. If the current data meets or exceeds a threshold deviation from expected values, then the controller 50 may determine that maintenance should be performed, may shut down at least a portion of the turbine system 10, may generate a maintenance plan, may trigger an alarm, and/or may send an alert, among other actions.

Figure 2:
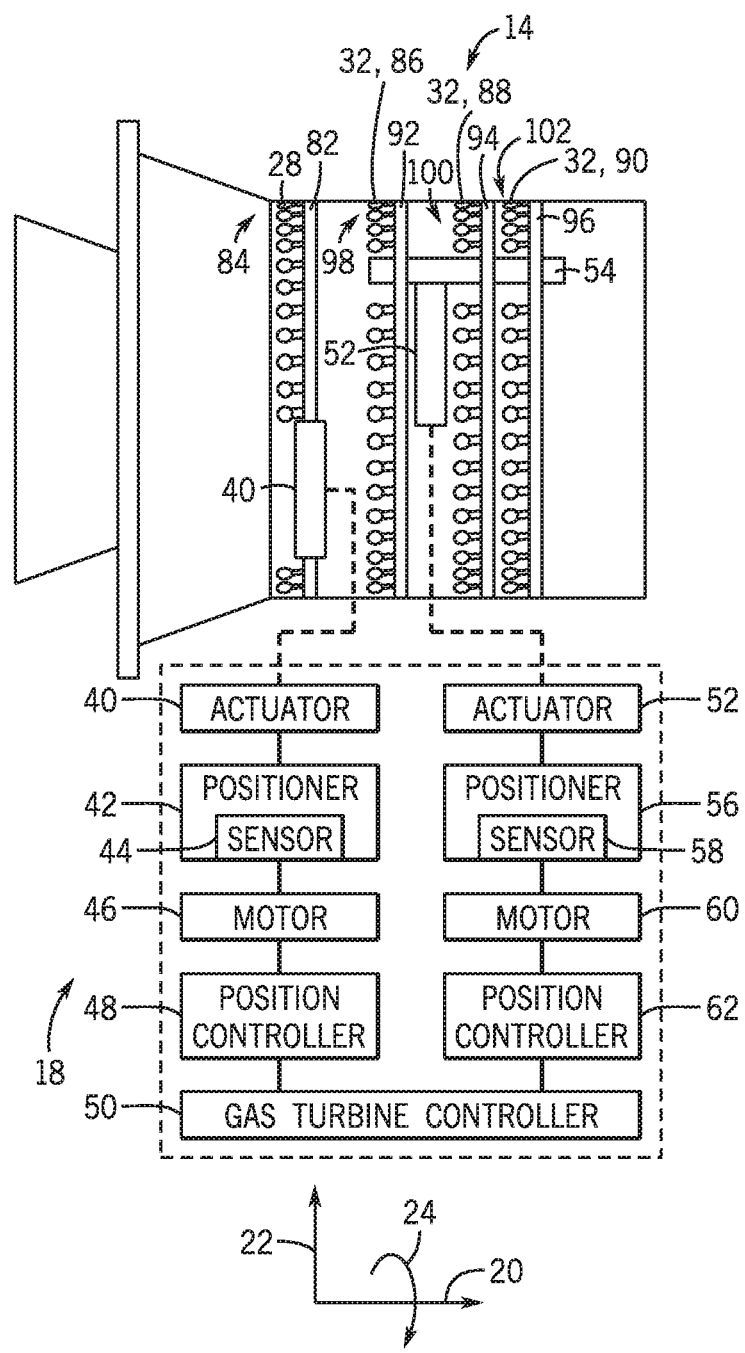
FIG. 2 is a partial cross-sectional view of an embodiment of the compressor of FIG. 1, illustrating inlet guide vanes (IGVs) and multiple sets of variable stator vanes (VSVs) adjusted by the actuation system.

FIG. 2 illustrates a partial cross-sectional view of an embodiment of the compressor 14, showing the IGVs 28 and the VSVs 32 in greater detail. Again, it should be noted that the adjustable vanes 16 may be applied to a variety of rotating equipment, such as the compressor 14, the turbine 12, or any combination thereof. As shown, the IGVs 28 are coupled to a first unison ring 82 and are positioned with a first pitch 84. The IGV positioner 42 is coupled to the IGV actuator 40 to position the actuator 40 and monitor usage characteristics of the actuation system 18 via one or more sensors 44. The actuator 40 may move the first unison ring 82 in a positive or negative circumferential 24 direction, thereby moving each of the IGVs the corresponding circumferential 24 direction.

In certain embodiments, each of the IGVs 28 may be positioned at a substantially similar pitch by the actuator 40 being positioned by the IGV positioner 42 according to commands received from the first position controller 48, which is controlled by the master controller 50. In a similar manner, first, second, and third stages 86, 88, and 90 of the VSVs 32 are coupled to respective unison rings 92, 94, and 96. The VSV positioner 56 may be coupled to the VSV actuator 52 to position the VSV actuator 52 by the VSV position controller 62 controlled by the master controller 50. That is, the VSV actuator 52 may be positioned by the VSV positioner 56 to move the torque tube 54 in a positive or negative circumferential 24 direction to adjust each of the unison rings 92, 94, and 96 in the corresponding circumferential 24 direction. The movement of the unison rings 92, 94, and 96 adjust respective pitches 98, 100, and 102 of the VSV stages 86, 88, and 90. As noted earlier, the compressor 14 may include any suitable number of VSV stages. For example, the compressor may be a single-stage compressor having a single VSV stage, a dual-stage compressor having two VSV stages, or a multi-stage compressor having 3, 4, 5, or more VSV stages.

Because the pitches 98, 100, and 102 of the VSVs 32 are adjusted collectively by the position of the torque tube 54, it may be desirable for the pitches 98, 100, and 102 to move in a predetermined ratio relative to one another. That is, a certain position of the torque tube 54 may correspond to specific pitches of the VSVs 32, and adjustment of an individual VSV pitch may affect the other VSV pitches. For example, the pitches 98 and 100 may have a constant ratio relative to one another while the torque tube 54 is adjusted. While the pitches 98 and 100 may change, their ratio may remain approximately constant during operation of the gas turbine system 10. Such a configuration enables relatively predictable operation of the gas turbine system 10. It should be noted, however, that certain embodiments may employ additional actuators to enable each of the VSV pitches 98, 100, and 102 to be adjusted independently of one another or may vary pitches between VSVs by causing a movement of the torque tube 54 to affect the unison rings 92, 94, and/or 96 differently or movement of the unison rings 92, 94, and/or 96 to differently affect the pitches 98 and 100. For example, a pivot location may be further from the unison ring for one ring than for other rings.

As shown, the IGVs 28 are adjusted by the IGV actuator 40 via movement of the first unison ring 82, whereas the VSVs 32 are collectively adjusted by the VSV actuator 52 via movement of the torque tube 54. This configuration enables the first pitch 84 of the IGVs 28 to be controlled separately and independently of the VSV pitches 98, 100, and 102. For example, during start-up operation, it may be desirable to adjust the first pitch 84 of the IGVs 28 to throttle flow of the air 64 while maintaining the VSV pitches 98, 100, and 102 approximately constant. On the other hand, during steady-state or full-load operation, it may be desirable to adjust the VSV pitches 98, 100, and 102, while maintaining the first pitch 84 of the IGVs 28 approximately constant to control the outlet pressure or pressure ratio of the compressor 14. Thus, in certain configurations, the IGVs 28 may have a greater influence on the flow rate of the air 64 through the compressor 14, while the VSVs 32 may have a greater influence on the pressure profile within the compressor 14. Simultaneously controlling the IGVs 28 and VSVs 32 may enable a targeted flow and pressure profile within the compressor 14.

As previously discussed multiple actuators may be coupled to each unison ring or torque bar to improve the stability and operability of the unison rings. In general, 1, 2, 3, 4, or more actuation systems may be coupled directly or indirectly (e.g., through the torque tube 54) to each unison ring. The controller 50 may receive data via the sensors 44, 58, and may then derive certain predictive and/or diagnostic conditions based on the data. For example, dynamic and static forces related to rubs, friction, temperature changes, current flow, and/or voltage differences may be used to derive the predictive and/or diagnostic conditions.

Figure 3:
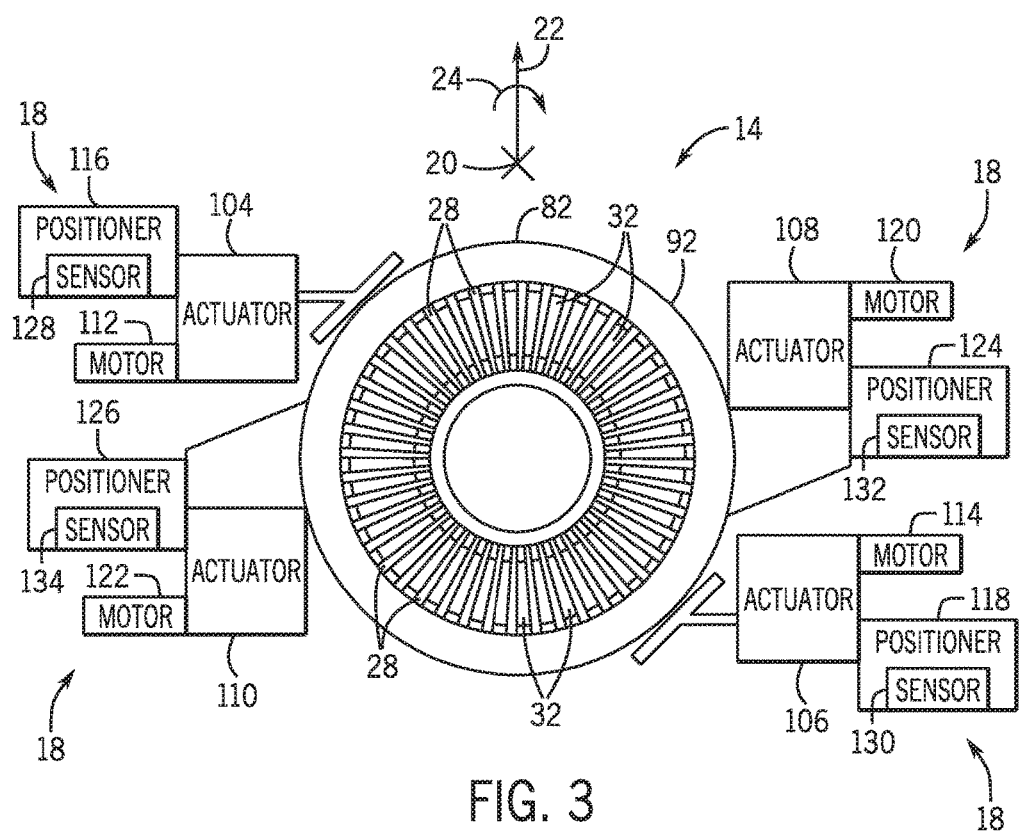
FIG. 3 is front view of an embodiment of the compressor of FIG. 1, illustrating an actuation system suitable for adjusting compressor vanes in coordination with one another.

As shown in FIG. 3, the unison rings (e.g., 82, 92, 94, 96) may be coupled to two or more actuators spaced circumferentially 24 about the compressor 14. More specifically, FIG. 3 illustrates a front view of an embodiment of the compressor 14 including multiple actuators coupled to the unison rings (e.g., 82 and 92) of the IGVs and VSVs. Specifically, IGV actuators 104 and 106 are coupled to the unison ring 92 of the IGVs 28 and VSV actuators 108 and 110 are coupled to the unison ring 82 of the VSVs 32. The IGV actuators 104 and 106 are driven by respective motors 112 and 114 and positioned by respective positioners 116 and 118, whereas the VSV actuators 108 and 110 are driven by motors 120 and 122 and positioned by positioners 124 and 126. The IGV positioners 116 and 118 include sensors 128 and 130, and the VSV positioners 124 and 126 include sensors 132 and 134. Each set of actuators (e.g., 104 and 106, 108 and 110) is spaced circumferentially about the longitudinal axis 26 of the compressor 14, which enables a relatively uniform movement of the unison rings 82 and 92. It should be noted that other arrangements of the actuators 104, 106, 108, and 110, may be envisioned, depending on the physical or spatial limitations of the compressor 14 and/or surrounding area. Furthermore, in embodiments with more than one actuation system, it may be desirable for the multiple actuators and/or associated components (e.g., positioner, controller, motor) to be in communication with each other, thereby improving the operability of the actuation system 18. Indeed, the positioners' sensors may send usage data and the position controllers may send status information to the turbine master controller 50 so that the controller 50 may information about operation of the turbine system 10 (e.g., the compressor 14).

Although each unison ring may be coupled to more than one actuator, a single actuator may be sufficient to drive the unison ring and the connected vanes to a target pitch and/or maintain the vanes at the target pitch. In some cases, this period may be during a period of lower actuator power requirements, such as start up or shutdown. During these occasions, the actuator system 16 may place one or more actuators in a diagnostic mode. The diagnostic mode may include an off mode, a low power mode where a reduced amount of power (e.g., current) is provided to the motor, a backdrive mode where the motor is applied with current to drive the actuator in a direction opposite of the direction used to maintain or move the vanes, or any combination thereof. In other words, the diagnostic actuator (e.g., actuator 38) may provide a relatively small amount of aid in moving/holding the vanes, may not aid moving/holding the vanes, and/or may oppose moving/holding the vanes to a relatively low degree. This opposition, disablement, or small power consumption provides more information at the controller 42 about the actuators and their respective accessories (e.g., positioners and/or motors) than an actuator in a drive mode. For example, when the diagnostic actuator is turned off, the actuator system 16 may be able to diagnose wear or other issues within the actuator (or its accessories) that is off.

Figure 4:
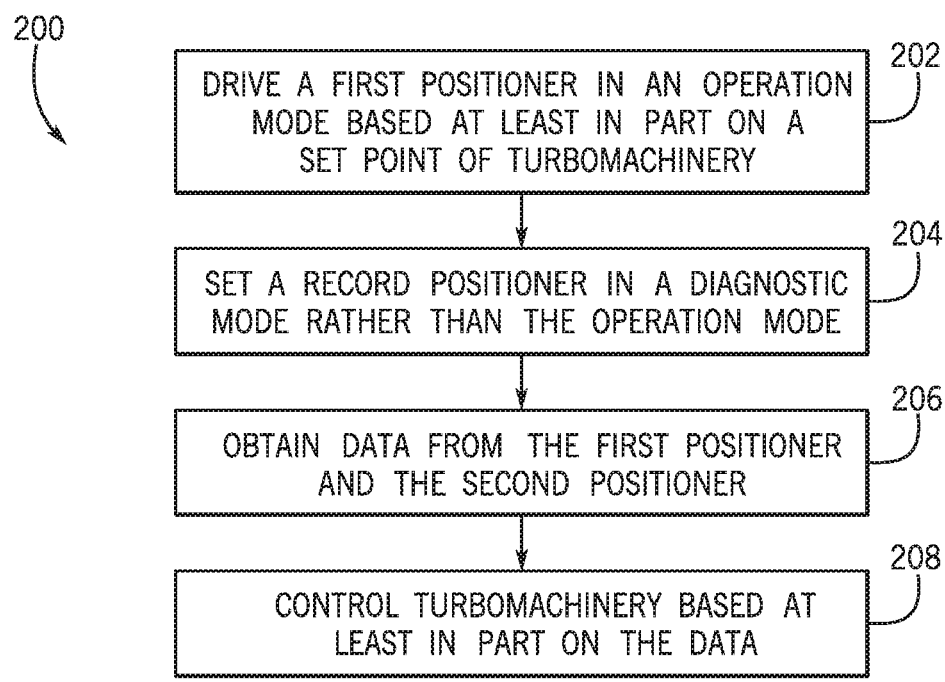
FIG. 4 is a flow diagram of an embodiment of a process for placing one actuator of the actuation system of FIG. 3.

FIG. 4 is a flow diagram of an embodiment of a process 200 that may be performed by a controller system (including the master controller 50, the position controller 48, and/or the position controller 62) to operate the turbine system 10. The controller 50 (directly or using the position controllers 48 or 62) drives a first positioner, in an operation mode, for an actuator of the turbine system (block 202). For example, the positioner may position vanes of a compressor 14 of the turbine system 10. Moreover, the controller system may drive multiple positioners and/or multiple actuators. For example, in some embodiments, the controller system may drive an actuator for IGVs and an actuator for VSVs. Driving the actuator may include moving the actuator and/or maintaining an actuator position. For example, moving the actuator may include supplying electrical power to an electric motor to move the actuator.

The controller system sets a second positioner in a diagnostic mode rather than the operation mode (block 204). The diagnostic mode may include a non-operational or disabled mode, a lower power drive mode, and/or a back drive mode where a direction of force is inverted. By reducing, eliminating, or reversing the force (e.g., via an electric motor), data read through the diagnostic mode actuator that is not subject to clipping due to limits on the actuator, positioner, or their motor. In other words, the diagnostic actuator may receive more accurate information than that obtained by an operating actuator that is moving/maintaining the vanes of the compressor 14. Furthermore, the data at the diagnostic actuator may not include variations in data that is actuator dependent thereby indicating health of the diagnostic actuator (and its accessories) and/or the operational actuator (and its accessories). For example, the diagnostic mode of the actuator may indicate a wear condition of the diagnostic actuator that may effect operation of the diagnostic actuator when the diagnostic actuator is in the operation mode.

During some portions of operation of the turbine system, the first and second positioners may operate in the operation mode or the diagnostic mode. For example, during a full load of the turbine system, both actuators may be in an operation mode and exerting force on vanes of a compressor of the turbine system via a unison ring to hold the vanes at a pitch or move the vanes to a target pitch. However, during some states (e.g., during a shutdown sequence), either of the actuators may be placed in the diagnostic mode while the other actuator remains in operation mode. These states may include any state where a single actuator provides a sufficient amount of force and/or stability to have the compressor operate as desired during the state.

The controller system obtains data back from the first and second positioners (block 206). The data may include an amount of force that is used to move the actuators and/or maintain a position of the actuator. Additionally or alternatively, the data may include information about a position of the actuators. For example, the controller system may receive resolver counts that give a physical location of the actuators based on a number of rotations of a portion (e.g., a shaft) of the positioners.

The controller system may derive information about one or more portions of the turbine system from the data. For example, the controller system may derive operating conditions as a wear condition of either of the first or second positioners and their associated elements. Moreover, the controller system may compare real time data to previous conditions. The comparison may include using a best fit algorithm (e.g., sum of least squares) to determine how closely the live data matches a reference data set.

The controller system controls the turbine system based at least in part on the data (block 208). Controlling the turbine system may include direct control based on the derived operating conditions. For example, the controller system may change operation based on the derived operating conditions by altering vane pitches, shutting down the turbine system, and/or performing other control actions based on the derived operating conditions. The controller system may perform these actions due to identification of whether the turbine system is acting within a permissible range of operation. If outside of the permissible range, a notification may be displayed via a human-machine-interface or modification of operation of the turbine system may be made. For example, if a condition is met, the controller system may control the turbine system accordingly and/or notify a monitoring device and/or user of the condition via a human-machine-interface. Based on the control or the notification (e.g., alarming or alerting notifications), maintenance may be planned for component tracked by the trending data. For instance, the controller system may generate a notification to a user to schedule a maintenance for the machine during the next offline period.

Additionally or alternatively, the controller system may receive an indication (e.g., via a human-to-machine interface) of an expected operating condition event. The controller system may compare a reference data set corresponding to the indicated event to real time data to verify whether the turbine system is operating within expected parameters. If the operation is outside the expected parameters, a re-identification of the operating condition may occur and/or corrective actions may be made to operation of the turbine system.

Although the foregoing generally discusses an IGV and a VSV (with 3 stages), in some embodiments, any number of vanes (e.g., only an IGV or only a VSV) may be deployed. Additionally or alternatively, an IGV and one or more VSVs may share one or more common actuators, positioners, and/or motors. Thus, the foregoing may be applied to any actuation system for any number of vanes include only VSVs, only IGVs, or any combination of VSVs and IGVs.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An actuation system of turbomachinery, comprising:
   a first actuator configured to control pitch of vanes of the turbomachinery;
   a first positioner configured to position the first actuator to control the pitch of the vanes;
   a second actuator configured to control the pitch of the vanes of the turbomachinery;
   a second positioner configured to position the second actuator to control the pitch; and
   a controller system communicably coupled to the first and second positioners, wherein the controller system is configured to:
   drive the first positioner in an operation mode based at least in part on a set point of the turbomachinery, wherein the operation mode comprises driving the first actuator to exert a first force;
   set the second positioner in a diagnostic mode rather than the operation mode, wherein the diagnostic mode comprises backdriving the second actuator to exert a second force in an opposite direction of the first force;
   obtain data from the first positioner and the second positioner, wherein the data indicates operating conditions of the turbomachinery; and control the turbomachinery based at least in part on the operating conditions of the turbomachinery.

2. The actuation system of claim 1, wherein the vanes of the turbomachinery are vanes of a compressor of the turbomachinery.

3. The actuation system of claim 2, wherein the first and second actuators are coupled to one or more inlet guide vanes (IGVs) of the compressor, the first and second actuators are configured to move the IGVs of the compressor, and the first and second positioners are configured to respectively position the first and second actuators to move the IGVs to a first target pitch.

4. The actuator system of claim 2, wherein the first and second actuators are coupled to one or more variable stator vanes (VSVs) of the compressor, the first and second actuators are configured to move the VSVs of the compressor, and the first and second positioners are configured to position the first and second actuator to move the VSVs to a second target pitch.

5. The actuator system of claim 2, wherein the operating condition for the turbomachinery comprises operating conditions within the compressor.

6. The actuator system of claim 5, comprising:
a first motor coupled to the first positioner,
a second motor couple to the second positioner.

7. The actuator system of claim 6, wherein the first motor is configured to drive the first actuator, and the second motor is configured to drive the second actuator.

8. The actuator system of claim 7, wherein the first and second motor each comprise an electric motor, and an amount of the first force comprises a current used for the target pitch.

9. The actuator system of claim 8, wherein each electric motor receives a respective current that sets a level of force exerted and a direction of the force exerted.

10. The actuator system of claim 1, wherein the diagnostic mode comprises driving the second actuator at a lower power level than used to drive the first actuator.

11. Tangible, non-transitory, and computer-readable medium storing instructions thereon, wherein the instructions, when executed, are configured to cause a processor to:
drive a first positioner of a first actuator of vanes of turbomachinery in an operation mode based at least in part on a set point of the turbomachinery;
set a second positioner of a second actuator of the vanes in a diagnostic mode rather than the operation mode, wherein the diagnostic mode comprises backdriving the second actuator against the first actuator;
obtain data from the first positioner and the second positioner, wherein the data indicates operating conditions of the turbomachinery; and
control the turbomachinery based at least in part on the operating conditions of the turbomachinery.

12. The tangible, non-transitory, and computer-readable medium of claim 11, wherein operating conditions comprise a wear condition of the second actuator.

13. The tangible, non-transitory, and computer-readable medium of claim 11, wherein controlling the turbomachinery comprises scheduling a maintenance of the second actuator.

14. A turbine system comprising:
a compressor comprising:
a plurality of inlet guide vanes (IGV) each with a variable IGV pitch and each guiding incoming fluid into the compressor; and
a plurality of variable stator vanes (VSV) each with a variable VSV pitch and each controlling flow of fluid through the compressor;
a first IGV actuator configured to control pitch of the each of the IGVs of the plurality of IGVs;
a second IGV actuator configured to control pitch of the each of the IGVs of the plurality of IGVs;
a first VSV actuators configured to control pitch of each of the VSVs of the plurality of VSVs;
a second VSV actuators configured to control pitch of each of the VSVs of the plurality of VSVs;
a plurality of positioners each configured to respectively position the first IGV actuator, the second IGV actuator, the first VSV actuator, or the second VSV actuator to control the pitch of the IGVs or VSVs, respectively;
a controller system communicably coupled to the plurality of positioners, wherein the controller system is configured to:
drive a first positioner of the plurality of positioners in a drive mode based at least in part on a set point of the turbine system;
place a second positioner in a diagnostic mode rather than the drive mode wherein the diagnostic mode comprises driving the second actuator at a lower power level than used to drive the first actuator;
obtain data from the first positioner and the second positioner, wherein the data indicates wear of the second positioner and its associated actuator.

15. The turbine system of claim 14, wherein the diagnostic mode comprises a backdrive mode or a non-driving mode.

16. The turbine system of claim 14, comprising:
an IGV unison ring coupling the first and second IGV actuators to the IGVs and transferring force from the first and second IGV actuators to the IGVs; and
a VSV unison ring coupling the first and second VSV actuators to the VSVs and transferring force from the first and second VSV actuators to the VSVs.

* * * * *